Jan. 29, 1957 R. C. RUMBLE ET AL 2,779,192
SUBSURFACE FLOWMETER
Filed Dec. 17, 1953
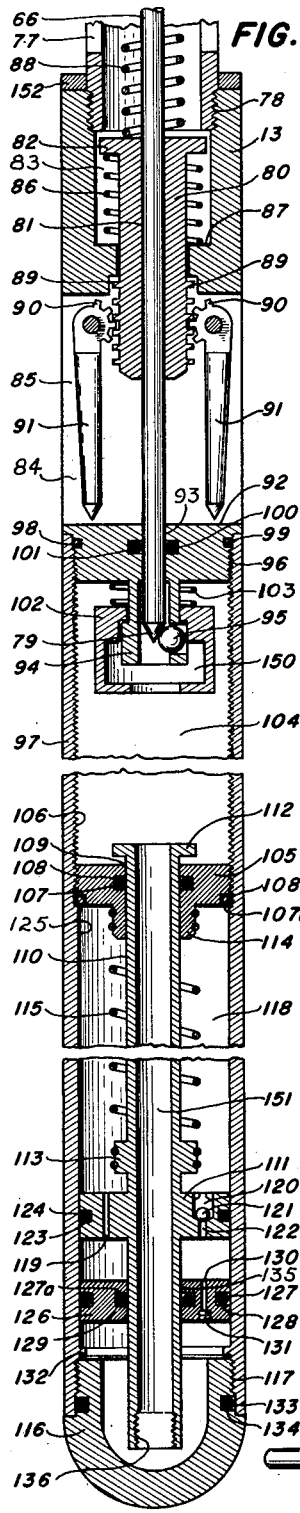
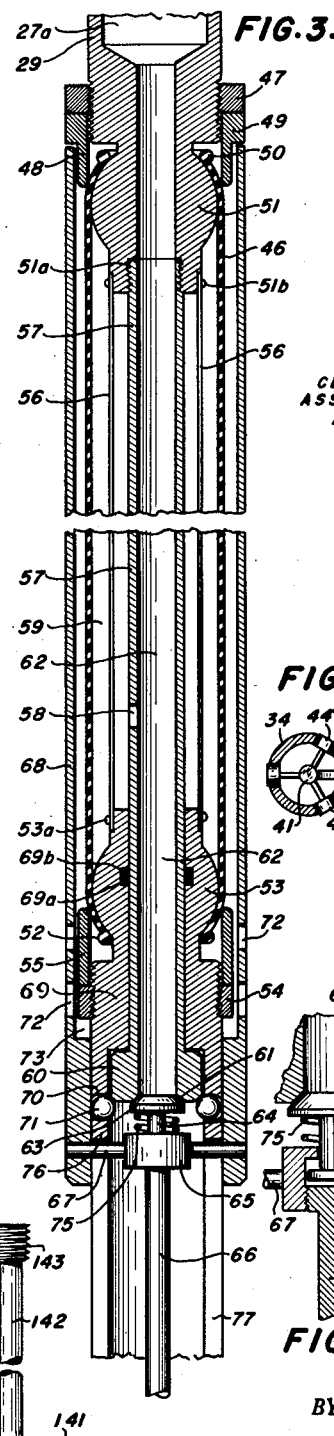
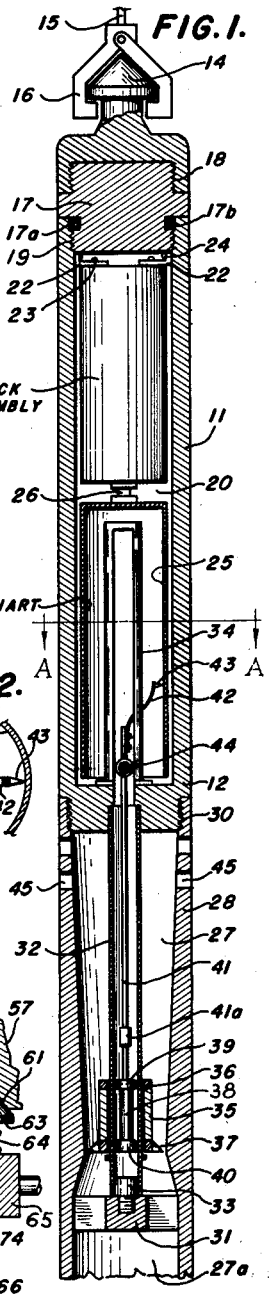
FIG. 4.
INVENTORS.
Robert C. Rumble,
BY Beldon A. Peters,
ATTORNEY.

United States Patent Office 2,779,192
Patented Jan. 29, 1957

2,779,192

SUBSURFACE FLOWMETER

Robert C. Rumble and Beldon A. Peters, Houston, Tex., assignors, by mesne assignments, to Esso Research and Engineering Company, Elizabeth, N. J., a corporation of Delaware Application December 17, 1953, Serial No. 398,722

6 Claims. (Cl. 73—155)

The present invention is directed to a subsurface flow meter. More particularly, the invention is directed to a subsurface well flow meter for use in detecting fluid flow in a well penetrating subsurface earth strata. In its more particular aspects, the invention has to do with a well flow meter comprised of improved means for detecting flow of fluids and providing a record thereof.

The invention may be briefly described as a well flow meter which comprises an elongated body member provided with an elongated chamber having an inlet and an outlet for flow of well fluids through the chamber. The body member is provided with means for anchoring the body member in a well bore. Arranged on and carried by the body member is a packing member for sealing off the space between the body member and the wall of the well bore. Arranged in the chamber co-axially with the longitudinal axis thereof is a tubular guide member. Slidably mounted on the tubular guide member is a magnetic float member which is adapted to move upwardly and downwardly in the chamber on flow of fluids therethrough. A magnetic follower member is arranged inside the guide member for movement with the float member. The float member operates in fluid at well pressure while the magnet follower moves in an enclosed air space, thus eliminating the necessity for a packing element between the metering float and recording chart. The follower member has attached to it an elongated member which moves within a cylindrical chart. Attached to the elongated member is a marking means such as a stylus which is spring-biased into contact with the cylindrical chart. The chart is driven by a motor, such as clockworks, and a trace is displayed on the chart in response to fluid flow through the chamber and movement of the float member.

The float member and the chamber comprise a rotameter, or variable area flowmeter, for determining the flow from the inlet to the outlet.

The packing means is arranged between the inlet and the outlet for directing flow through the chamber. The packing means may be enclosed normally by a slidable sleeve. The body member has means arranged therein for releasing and moving the slidable sleeve to free the packing member. The packing member encloses a space in fluid communication with the inlet. The space has arranged in it at least one spring member for filling this space with well fluid by inflating the packing member.

The body member may be comprised of a first section and a second section with the first section movable with respect to the second section. The packing member is attached to the first section and to the second section. The seal is formed by moving the first section with respect to the second section.

The present invention will be further illustrated by reference to the drawing, in which:

Fig. 1 is a partial sectional view of an upper end of the device in accordance with the present invention;

Fig. 2 is a cross-sectional view taken along the lines A—A of Fig. 1;

Fig. 3 is a partial cross-sectional view of the middle portion of the flow meter of the present invention;

Fig. 4 is a detail of a portion of the apparatus of Fig. 3;

Fig. 5 is a sectional view of the lower portion of the apparatus of the present invention; and Fig. 6 illustrates a mechanism for setting the device prior to operating same.

Referring now to the drawing, numeral 11 generally indicates a body member which is comprised of a first section 12 and a second section 13. The first section 12 is provided on its upper end with a fishing neck or spear 14 which is attached to a wire line 15 by means of a grab hook 16, and the like. The fishing neck 14 is threadably connected to the section 12 by way of a threaded plug member 17 which, in turn, is connected to section 12; the fishing neck 14 and section 12 being connected to plug member 17 by mating threads 18 and 19, respectively, and a fluid seal is effected between section 12 and plug member 17 by means of O-ring 17a set in recess 17b. Section 12 is provided with a chamber 20 in which is arranged a clockwork assembly or other motivating means 21 which is shown diagramatically and which is attached to the upper end of the walls of the chamber by brackets 22 which, in turn, are attached to the clockwork assembly 21 and the walls of the chamber 20 by screw threads 23 and 24.

Arranged below the clockwork assembly 21 in the chamber 20 is a cylindrical chart 25 which is designed to rotate in chamber 20, being interconnected with the clockwork assembly by a coupling member 26 which causes rotation of the chart.

Arranged below the chamber 20 in the section 12 is an elongated chamber 27 defined by the walls 28 of a member 29 which is threadably connected to, and forms part of section 12, by means of mating threads 30. The chamber 27 is a rotameter chamber and has a general configuration common to such rotameter chambers as illustrated. The lower portion of the rotameter chamber is provided with a spider device 31 which supports a tubular guide member 32 which projects through the chamber 27 and is connected to the section 12. The lower end of the tubular member 32 is closed by a threaded closure member 33 while the upper end of the tubular guide member 32 communicates with the interior of the chart 25 through a slotted cylinder 34.

Slidably mounted on the guide member 32 in the chamber 27 is a rotameter float 35 which consists of a strong cylindrical permanent magnet such as Alnico V provided with soft iron pole pieces 36 and 37 at its poles to concentrate the magnetic field in the desired direction, the float member 35 and the pole pieces 36 and 37 comprising a float magnet. Arranged in the tubular member 32 is a magnetic follower 38 which is comprised of a permanent magnet body such as Alnico V terminated by soft iron pole pieces 39 and 40. Attached to the magnetic follower 38 is an elongated member 41 which extends through the guide member 32 into the slotted cylinder 34. Attached to the upper end of the elongated member 41 is a leaf spring or biasing means 42 which has a stylus 43 attached thereto in operative relationship with the chart 25. The elongated member 41 is provided with a plurality of roller bearings 44 which are shown more clearly in Fig. 2.

It is to be noted that the upper end of the chamber 27 is provided with a plurality of outlets 45 through which fluid entering the chamber 27 through an inlet described in detail hereinafter is discharged into the well bore into which the device is lowered by means of the wire line 15.

Referring now to Fig. 3, it will be noted that the member 29 carries an expansible packing member 46 which is attached to the member 29 by means of a threaded nut 47 and a sleeve 48 which is provided with a shoulder 49. The packing member 46 has a bead 50 which fits snugly against curved section 51 of the member 29. The packing member 46 is sealed by taking up on the nut 47 which moves the sleeve 48 downward against the outer surface of the packing member 46.

The lower end of the packing member 46 is also provided with a bead 52 and the lower end of the packing member 46 is held into engagement with a curved member 53, which is similar to the curved member 51, by means of a threaded nut 54 and a cylindrical sleeve 55. On taking up on the nut 54 the sleeve 55 is forced against the outer surface of the packing member 46 and causes it to be retained on the curved member 53.

Connected to the curved member 51 by hinges 51b and the curved member 53 by hinges 53a is a plurality of flat springs 56 which are enclosed in the packing member 46. Threadably connected to the curved member 51 by threads 51a is a tubular member 57 which is provided with at least a port 58 communicating the interior of the tubular member 57 with the space 59 enclosed by the packing member 46 in which the spring members 56 are arranged. The tubular member 57 terminates in a shoulder 60 which forms an inlet 61 for the passageway 62 through the tubular member 57 into chamber 27a in the member 29 which communicates the spider 31 with chamber 27. The inlet 61 is closed by a valve means 63. The valve means is connected by means of a coupling 64, shown in more detail in Fig. 4, to a plug 65. The plug 65 is connected to a rod member 66 which will be described in more detail. Connected to the plug 65 are pins 67 which, in turn, are connected to a sleeve member 68 which is normally held in enclosing relationship with the packing member 46, as shown, while the device of the present invention is lowered in a well bore.

The curved member 53 forms the upper end of a plug member 69 to which the nut 54 is threadably engaged. The plug member 69 encloses the shoulder 60 and the lower end of the tubular member 57. Member 53 and plug 69 are part of section 13. The plug member 69 has a plurality of recesses 70 in which are arranged spheres or balls 71 which serve to hold the first section 12 against movement with respect to the second section 13 as will be described.

It is to be noted that the sleeve 68 is provided with ports 72 and the lower end of the sleeve member 68 defines with the plug member 69 a space 73, the purpose of which will be described in more detail hereinafter.

Referring now to Fig. 4, it will be seen that the plug 65 and the coupling 64 are threadably connected to the rod 66 by a screw plug 74. Also it will be seen that the valve member 63 is biased to close the inlet 61 by a spring 75.

The upper end of the section 13 is comprised of the member 69 which defines the recess 70 with part 76 in which the spheres or balls 71 are arranged and provides a slotted member 77 which is connected at its lower end by mating threads 78, as shown in Fig. 5, to the main portion of section 13. The rod member 66 protrudes into the section 13 and has a pointed lower end 79, the function of which will be described in more detail hereinafter.

Section 13 is provided with a rack member 80 having a passageway 81 for the rod 66. The rack member 80 has a shoulder 82. The upper end of the rack member 80 is arranged in a chamber 83 while the lower end protrudes into a window section 84 provided with windows 85. The rack member 80 is biased upwardly by a helical coil spring 86 which bears upwardly against the shoulder 82 and against the lower wall 87 of the chamber 83.

Resting on the upper end of the shoulder 82 is a helical coil spring 88 which acts as a shock absorber and depresses rack member 80 when sleeve 68 is released as will be described further. The rack member 80 has teeth 89 on its lower end which engage with teeth 90 of dogs 91 which are adapted to move out through windows 85 into engagement with the wall of the well.

A wall member 92 provides a passageway 93 for the lower end of the rod member 66 and carries a downwardly extending member 94 which encloses the pointed end 79 of the rod 66 which holds a sphere or ball 95 in engagement with the end 79 and thus supports the rod 66 and pin 67 and holds the sleeve 68 in enclosing relationship with the packing member 46.

The wall member 92 is threadably connected by mating threads 96 to an end member 97 which is sealed to the wall member 92 by means of an O-ring 98 in a recess 99. The wall member 92 is provided with a recess 100. An O-ring 101 is arranged to provide a fluid-tight seal with the rod member 66 in passageway 93.

Enclosing the member 94 is a cage 102 which is normally biased in a downward direction by a spring 103. The end of rod member 66 and the cage 102 are arranged in the upper end of a chamber 104 defined by the wall member 92 and a second wall member 105 which is threadably engaged with section 97 by threads 106. The wall member 105 is provided with a recess 107 in which is arranged an O-ring 108 to form a seal with the upper end 109 of an extension member 110 which forms part of a piston member 111. Wall member 105 is also provided with a recess 107–A and an O-ring 108–A to seal it against wall member 125. The upper end of the extension member 110 is provided with a shoulder 112 which projects into the chamber 104 and which is arranged in operative relationship with the cage 102.

Arranged between a shoulder 113 of the piston member 111 and a shoulder 114 of the wall member 105 is a biasing means, such as a helical coil spring 115, which normally urges the piston member 111 in an upward direction.

It is to be noted that the wall member 105 and a plate member 126 define a chamber 118 which is adapted to be filled with a suitable hydraulic fluid, such as a mineral oil or a silicone fluid having a viscosity of about 12,500 centistokes at 25° C. The piston member 111 is provided with a passageway 119 and a check valve 120 comprised of a ball 121 and a passageway 122. The piston member 111 has a recess 123 in which is arranged an O-ring 124 which provides a seal with the wall 125. Arranged below the piston member 111 in chamber 118 is a floating plate 126 which is provided with recesses 127 and 127–A in which are arranged, respectively, O-rings or sealing members 128 and 129. The plate 126 has a passageway 130 which may be closed by threaded plug 131.

The lower end of the end member 97 has an interiorly projecting circular shoulder 132 which serves to retain the plate 126 in the chamber 118 when setting the assembly as will be described.

It is to be noted that the bottom member 116 is provided with a recess 133 in which is arranged an O-ring or sealing member 134 forming a seal with the wall 125.

The lower end of the piston member 111 projects through a pasageway 135 in plate member 126 and is provided on its lower end with internal threads 136 which are adapted to cooperate with a setting device, such as shown in Fig. 6.

Referring to Fig. 6, it will be seen that the wrench 140 is provided with a handle 141 and an elongated member 142 which carries on a free end an externally threaded section 143, the threads of which are designed to be attached to threads 136 of piston member 111.

The apparatus of the present invention operates in the following manner:

Prior to lowering the device of Figs. 1 to 6 in a well bore, the bottom member 116 is opened and the chamber 118 is filled with a suitable hydraulic fluid, of the type mentioned, through the passageway 130.

The wrench 140 is threadably attached to threads 136 and the piston member 111 pulled down until shoulder member 112 rests on wall member 105, approximately as shown in Fig. 5. The bottom member 116 is then threadably connected to the wall 125 by threads 117 and the device lowered into the well bore to the position where it is desired to determine the flow of well fluids. The combination of hydraulic fluid viscosity and the tension of spring 115, and the size of port 119 of piston 111 are preselected to permit sufficient time to run the instrument into the hole before shoulder 112 moves into operational relationship with cage 102 and releases rod 66 which is forced downward by well pressure.

This spring-loaded piston arrangement with fluid escape port is commonly known as a dashpot. To describe the operation in more detail, the shoulder member 112 is forced upwardly by the biasing means 115 which causes fluid to be forced through the passageway 119 as the piston member 111 and extension 110 move upwardly into chamber 104. When the shoulder 112 engages with the cage 102, the cage is forced upwardly compressing the spring 103 which allows the sphere or ball 95 to move outwardly into the space 150 which releases the pointed end 79 of the rod 66 and well pressure forces rod 66 downward. This pulls the sleeve 68 downward exposing the packing member 46. As the rod 66 and the sleeve 68 move downward, the plug 65 comes into contact with the spring 88 compressing it and causing shoulder 82 to move downward compressing the spring 86 and forcing the rack member 80 downwardly engaging the teeth 89 with the teeth 90 of dogs 91 which are forced out into engagement with the wall of the well, anchoring the device of the present invention in fixed relationship with the wall thereof. The rod member 66 comes to rest in the piston member 111 and the extension member 110 in a passageway 151 provided therefor when the bottom of sleeve 68 bumps shocks absorbing washer 152.

Since the sleeve 68 has moved downward with relationship to the plug 69, as the space 73 passes adjacent to the recess 70 the spheres or balls 71 are free to move outwardly. The tubular member 57 connected to member 29 comprising section 12 may then move downward with respect to section 13. The wire line 15 is then slacked off which allows the section 12 including member 57 to move downward with respect to section 13. Movement downward of the section 12 and member 57 causes the springs 56 to bow outwardly within the packing member 46 and causing the space 59 to be enlarged and causing well fluid to be drawn into space 59 from passageway 62 through port 58. Continued movement of the member 57 downwardly causes the port 58 to move within plug 69 past O-ring 69-A in recess 69-B which closes port 58. Since the space 59 is filled, the packing member 46 is expanded into sealing relationship with the wall of the well bore by slacking the line further and allowing the weight of section 12 to bear on the packing member 46 and the enclosed fluid.

On downward movement of the rod 66 and attached valve 63 the inlet 61 is opened, thus allowing well fluids to pass through ports 72 in sleeve 68 and thence through the slotted sections 77 into inlet 61, passageway 62, chamber 27a and into chamber 27. This is possible by virtue of the packing member 46 having sealed off the space between the well flow meter and the wall of the well allowing fluids to be directed to the well flow meter. The flow of fluids through chamber 27 causes the rotameter float 35 to rise in the rotameter chamber 27. As the rotameter float 35, which comprises a floating magnet, rises the magnetic follower 38 also rises which causes the stylus 43 to make a mark on the rotating chart 25 which is driven by the clockwork assembly 21. Thus a record is made of the amount of flow through the chamber 27 at each instant covered by the time interval represented by the angle of rotation of the chart.

The elongated member 41 is provided with a universal joint 41a to allow for possible slight misalignment of guide member 32 and slotted cylinder 34.

In practice, the instrument may be run on a wire line through tubing out into cased as well as into uncased hole. The first measurement made in a given run is taken at the maximum depth desired and subsequent measurements may be taken at successively higher levels by lifting the instrument to the desired level and slowly slackening the line which causes a repetition of the setting and sealing process described above. The moment the upper section of the instrument is raised enough to uncover port 58 under the packer, the trapped fluid is immediately released, and the packer is deflated. When the instrument reenters the tubing on removal from the hole, the dogs are readily depressed by the lower end of the tubing forcing the rack upward against biasing spring 88.

While the device of the present invention has been illustrated by anchoring means, such as dogs 91, it is to be understood that other anchoring means may be used.

The device of the present invention has been used successfully in determining flow rates in oil wells. The protective sleeve serves to protect the packing member 46 as it is being lowered into the well bore.

The rotameter assembly comprised of the float 35 incorporating a magnet and the chamber 27 with the magnetic follower and stylus allows improved flow determinations to be made in wells producing fluid from subterranean strata. By virtue of having a packing member of the nature described in conjunction with the improved metering and recording device, improved results are obtained in producing intervals from which desired fluids are obtained in subsurface strata.

The present invention is particularly useful for lowering in a well through a tubing string on a wire line and the like, and is sufficiently small to pass readily through a tubing of about 2" diameter and be introduced into a well casing of substantially larger size of the order of 5" to 10". Thereafter the packer is expanded to fill and seal the casing or with the walls of a well bore. It is to be understood, however, that the device is adapted to and may be used in larger size pipe than 2" tubing.

The nature and objects of the present invention having been completely described and illustrated, what we wish to claim as new and useful and to secure by Letters Patent is:

1. A subsurface well flowmeter comprising an elongated body including upper and lower sections adapted to be moved relative to each other, fluid flow recording means arranged in said upper section, fluid flow responsive means positioned in said upper section and operatively connected to said fluid flow recording means, said upper section being formed as a hollow member to provide longitudinally spaced inlet and outlet ports and a passageway therebetween, movable closure means arranged on said lower section initially closing said inlet port, expansible packing means connected to said upper and lower sections between said inlet and outlet ports adapted to direct fluid flow through said fluid flow responsive means, means arranged in said lower section adapted to actuate said movable closure means thereby permitting fluid to flow through said inlet port and said outlet port, anchoring means connected to said lower section and engagedly connecting with said movable means adapted to anchor said lower section in the well, said upper section being formed with a side port fluidly communicating said packing means and said passageway, sealing means arranged on said lower section adapted to close off said side port from fluid flow therethrough upon movement of said upper section relative to said lower section whereby after said lower section is anchored and said closure means is opened, fluid in said upper section is drawn into said packing means as the upper section is moved relative to said lower section and fluid drawn into said packing means is trapped therein to seal off said well.

2. A subsurface well flowmeter comprising an elongated body including upper and lower sections movable relative to each other, a rotameter chamber arranged in said upper section, tubular guide means positioned axially in said chamber, magnetic float means arranged on said guide means adapted to move upon movement of fluid by the float means and through the chamber, magnetic follower means arranged within said tubular guide means adapted to move upon movement of said magnetic float means, a cylindrical chart arranged in said upper section, a slotted cylinder positioned within said cylindrical chart, extension means connected to said follower extending into said slotted cylinder, a stylus connected to said extension means extending through said slotted cylinder adapted to record movement of said follower means on said chart and a motor operatively connected to said cylindrical chart adapted to rotate same, said extension means being provided with roller bearings arranged in slots of said slotted cylinder to facilitate movement of said follower means, said upper section being formed to provide a fluid flow outlet port communicating with said chamber, an open-ended tubular member fluidly communicating with said chamber, movable closure means arranged on said lower section initially closing one end of said tubular member, expansible packing means connected to said upper and lower sections between the initially closed tubular end and said outlet port adapted to direct fluid flow through said tubular member and said rotameter chamber, means arranged in said lower section adapted to actuate said movable closure means, thereby permitting fluid to flow through said tubular member and said chamber, anchoring means connected to said lower section and engagedly connecting with said movable means adapted to anchor said lower section in said well, said tubular member being formed to provide a port intermediate its length adapted to fluidly communicate said tubular member and said packing means and adapted to be closed off from fluid flow therethrough upon movement of said upper section toward said lower section whereby after said lower section is anchored and said closure means is opened, fluid in said upper section is drawn into said packer as the upper section is moved relative to said lower section and fluid drawn into said packing means is trapped therein to seal off said well.

3. A subsurface well flowmeter comprising an elongated body including upper and lower sections movable relative to each other, said upper section being formed to provide longitudinally spaced inlet and outlet ports and a fluid flow passageway therebetween, fluid flow recording means positioned in said upper section, fluid flow responsive means positioned in said upper section in said fluid flow passageway and operatively connected to said fluid flow recording means, and expansible packing means positioned between said inlet and outlet ports adapted to direct fluid through said passageway, said upper section being formed to provide a side port fluidly communicating said packing means and said passageway, said side port being adapted to be closed off from fluid flow therethrough upon movement of said upper section toward said lower section, said lower section including movable closure means adapted to initially close said inlet port, timing means for actuating said closure means, and anchoring means operatively engageable with said closure means upon movement thereof adapted to anchor said lower section in the well whereby after said lower section is anchored and said closure means is opened, fluid in said upper section is drawn into said packing means as the upper section is moved relative to said lower section and fluid drawn into said packing means is trapped therein.

4. A device as recited in claim 3 wherein said flow recording means includes a motor, a cylindrical chart operatively connected to said motor, a cylindrical slotted member positioned within said chart and a stylus arranged within a slot of said slotted cylinder, said slotted cylinder providing a guide and retainer for said stylus, and wherein said flow responsive means includes a tubular guide means, a magnetic float means arranged on said guide means adapted to move upon movement of fluid flow by the float means and through the chamber, a magnetic follower means arranged within said tubular guide means adapted to move upon movement of said magnetic float means, means connecting said follower means to said stylus.

5. A subsurface well flowmeter comprising an elongated body member including first and second sections movable relative to each other, flow recording means positioned in said first section, a rotameter chamber and an elongated open ended tubular member being formed to provide a port intermediate its length positioned in said first section, said tubular port being adapted to be closed off from fluid flow therethrough upon movement of said upper section toward said lower section, one of said open ends of said tubular member fluidly communicating with said rotameter chamber, the other of said open ends being initially closed by valve means, flow responsive means arranged in said chamber operatively connected to said flow recording means, said body member being formed to provide a fluid flow outlet port fluidly communicating said rotameter chamber and the exterior of said body member, expansible packing means secured to said first and second sections sealingly enclosing said tubular member port to direct fluid flow through said tubular member upon expansion thereof, said second section being formed to provide fluid inlet openings adapted to permit fluid communication between the exterior of said second section and said valve means, a slidable sleeve connected to said valve means and being formed with a port therein and initially enclosing said expansible packing means, timing means arranged in said second section adapted to cause actuation of said valve means whereby said valve means and said sleeve move downwardly to permit fluid flow through said sleeve port, said second section inlet openings and said tubular member and anchoring means connected to said second section operatively engaging with said valve means adapted to anchor said second section in said well whereby after said lower section is anchored and said closure means is opened fluid in said upper section is drawn into said packer as the upper section is moved relative to said lower section whereby fluid drawn into said packer is trapped therein to seal off said well.

6. A device as recited in claim 5 wherein said flow recording means comprises a motor, a cylindrical chart operatively connected to said motor, a slotted cylinder positioned within said chart, a stylus extending through one of said slots in said slotted cylinder and wherein said flow responsive means comprises a tubular guide means, magnetic flow means arranged on said guide means adapted to move upon fluid flow thereby, magnetic follower means positioned in said guide means adapted to move upon movement of said magnetic float means, means connecting said follower means to said stylus and roller bearing means arranged in slots of said slotted cylinder and on said connecting means adapted to move with said stylus, said slotted cylinder providing a guide as a retainer for said roller bearings and said stylus.

References Cited in the file of this patent

UNITED STATES PATENTS

| 2,216,268 | Fritsche | Oct. 1, 1940 |
| 2,348,192 | Chambers | May 9, 1944 |
| 2,380,399 | Bowie | July 31, 1945 |
| 2,629,446 | Freling et al. | Feb. 24, 1953 |

FOREIGN PATENTS

| 814,943 | Germany | Sept. 27, 1951 |